United States Patent [19]

Sazaki

[11] 4,147,313
[45] Apr. 3, 1979

[54] BAIL LATCHING AND RELEASING MECHANISM FOR SPIN FISHING REEL

[75] Inventor: Kounin Sazaki, Fukuyama, Japan
[73] Assignee: Ryobi Ltd., Hiroshima, Japan
[21] Appl. No.: 875,662
[22] Filed: Feb. 6, 1978
[30] Foreign Application Priority Data

Feb. 18, 1977 [JP] Japan ............................ 52/19369[U]

[51] Int. Cl.² .............................................. A01K 89/01
[52] U.S. Cl. ................................................ 242/84.2 G
[58] Field of Search ...................... 242/84.2 G, 84.2 R, 242/84.21 R

[56] References Cited

U.S. PATENT DOCUMENTS

| | | | |
|---|---|---|---|
| 2,775,417 | 12/1956 | Freund | 242/84.21 R |
| 2,942,798 | 6/1960 | Alinari | 242/84.2 G |
| 3,834,644 | 9/1974 | Stackawicz | 242/84.2 G |

*Primary Examiner*—George F. Mautz
*Attorney, Agent, or Firm*—Sughrue, Rothwell, Mion, Zinn and Macpeak

[57] ABSTRACT

An internal bail arm latching and releasing mechanism for a spinning reel includes a spring biased bail arm 10 secured at one end to a pivot cam 8 rotatably mounted on a post 31 extending out from a support housing 7 integral with the reel rotor 1. The pivot cam carries two bosses in their spaced relationship adapted to engage a detent 25 of a spring biased slidably mounted L-shaped kick lever 18 having an upright portion 19. The latter is positioned to strike a key plate 27 when the rotor is turned with the bail arm cocked. This forces the kick lever outwardly to release the bail arm as it swings over to the rewind position. The boss 16 abuts the detent to hold the kick lever to thereby provide rotational clearance between the upright portion and the key plate.

4 Claims, 4 Drawing Figures

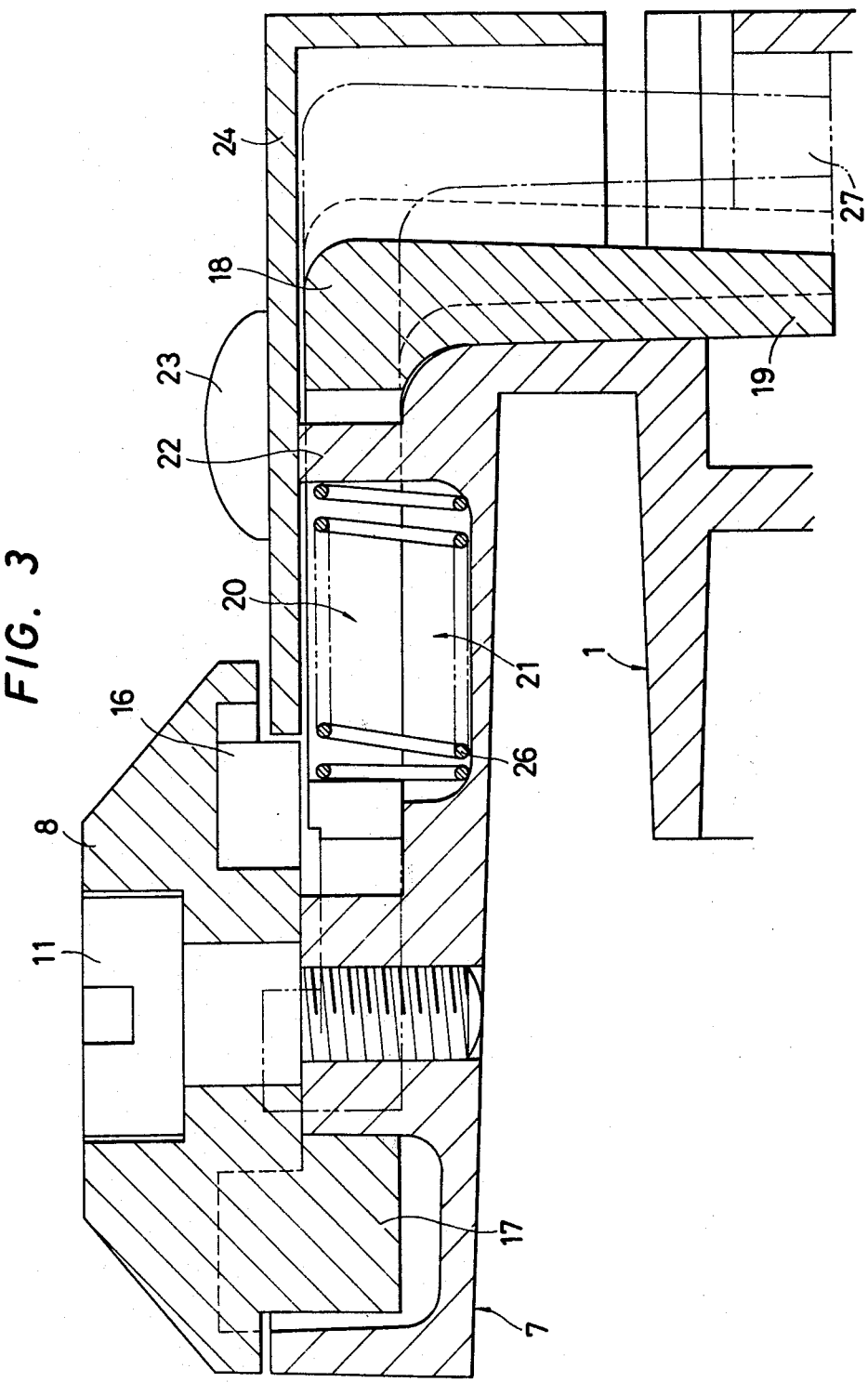

BAIL LATCHING AND RELEASING MECHANISM FOR SPIN FISHING REEL

BACKGROUND OF THE INVENTION

The present invention relates to an automatic and manual bail latching and releasing mechanism for an arm spool type of spin fishing reel.

In this type of spinning reel, bail latching and releasing action is necessiated to release and rewind the fishing line, and it is important for the fisherman's interest or preference to manually latch and release the bail arm as well as automatic operation.

The prior art bail control mechanisms are generally characterized by a number of exposed and protruding parts of sharp and irregular shape, such as the pivot cam at one end of the bail arm, the latching detent engageable with the cam, the fixed trip release for the detent, etc. The fishing line has a great tendency to become entangled in such parts when, as often happens, several turns of the line backlash and spill off of the reel spool, and the exposure of these parts also promotes their wear and breakage, snags clothing etc.

SUMMARY OF THE INVENTION

It is therefore, an object of the present invention to overcome the above-mentioned drawbacks and disadvantages and to provide an improved spinning reel. Briefly, according to the present invention, an automatic bail control mechanism includes a kick lever having a detent adapted to engage a bail arm pivot cam to thereby lock the bail arm in a cocked or casting position. The kick lever is disengaged from the bail arm pivot cam when it strikes a key plate to shift the bail arm from fishing line release position to rewind position. The pivot cam is provided with two bosses on the moving locus of the detent to engage therewith to hold the bail arm at its rewind or release position.

DETAILED DESCRIPTION OF THE INVENTION

Figure 1:
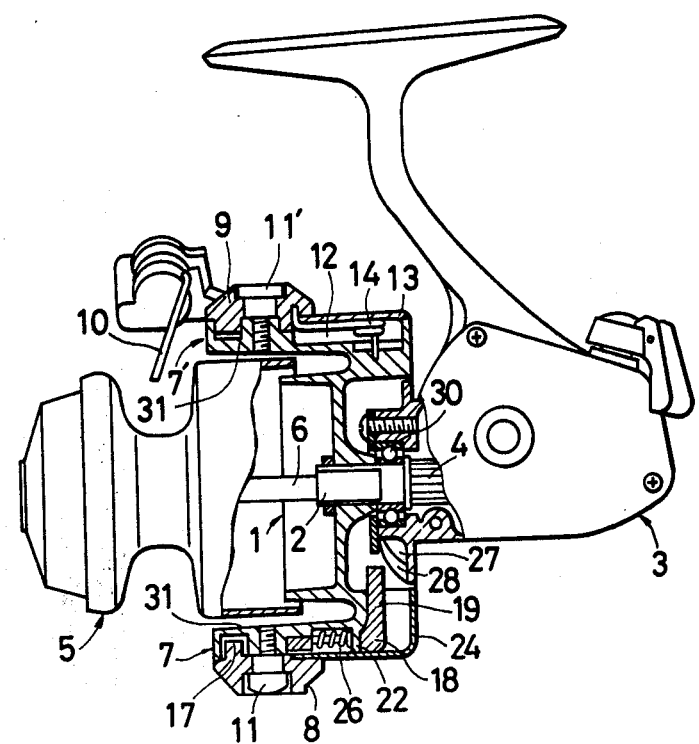
FIG. 1 shows a side view, partly in cross section of a spinning reel equipped with a bail latching and releasing mechanism according to the present invention.

Referring now to the drawings and initially to FIG. 1, a pair of support housings 7 and 7' are symmetrically disposed on diametrically opposite sides of a rotor 1, which is mounted through a bearing 30 on a tubular shaft 2 to a reel body 3. The shaft 2 has a pinion 4 at one end, and is rotated by a handle (not shown) coupled thereto by a main gear (not shown). A spool 5 is detachably supported by a main shaft 6 inserted into the tubular shaft 2. The main shaft is reciprocable by the reciprocating mechanism (not shown) in synchronism with the main gear to reciprocate the spool 5. A bail arm 10 is pivotally mounted on a posts 31 and 31 phogecting radially outwardly from the bottom walls of the respective support housing 7 and 7'. The bail arm 10 is coupled to a bail arm lever 9 at one end and to a pivot cam 8 at the other end, both of which are pivotally mounted to the posts 31 and 31 by shouldered step screws 11 and 11'. A bail arm turn spring 14 is in closure by a cover plate 13 and is housed in a recessed portion 21 of the support housing 7'. One end of the spring 14 is connected to the lever 9, and the other end thereof is connected to the bottom wall of the housing 7' to thereby bias the bail arm 10 toward a rewind and release position, since the dead point of the spring 14 is set between the rewind and release positions.

In the other or lower support housing 7, a square column 22 projects from the bottom wall of a recess 21 of the housing 7 at a proper spacing form the pivot post 31. The bail arm pivot cam 8 is provided with a first boss 16 adapted to be brought into contact with a projection 15' provided at the support housing 7 at a fishing line release operation, and a second boss 17 for pressingly urging a kick lever mentioned later.

A kick lever 18 having an elongated slot 20 in one portion thereof is slidably supported within the lower support housing 7 on the square column 22, which engages the slot 20. A spring 26 is disposed between one end of the slot 20 and the column 22 thereby biasing the kick lever 18 toward the pivot cam 8 as shown by an arrow a. The kick lever has a detent projection 25 at one end thereof, which is adapted to engage and latch the bosses 16 and 17 of the pivot cam 8.

The kick lever 18 according to the present invention has an L-shaped countour, which consists of a horizontally extending portion 32 having the slot 20 and the detent projection 25 and an upright portion 19 which extends radially inwardly of the housing. The recessed portion 21 is in closure by a cover plate 24 secured thereto by a screw 23 to house the kick lever 18.

Figure 2A:
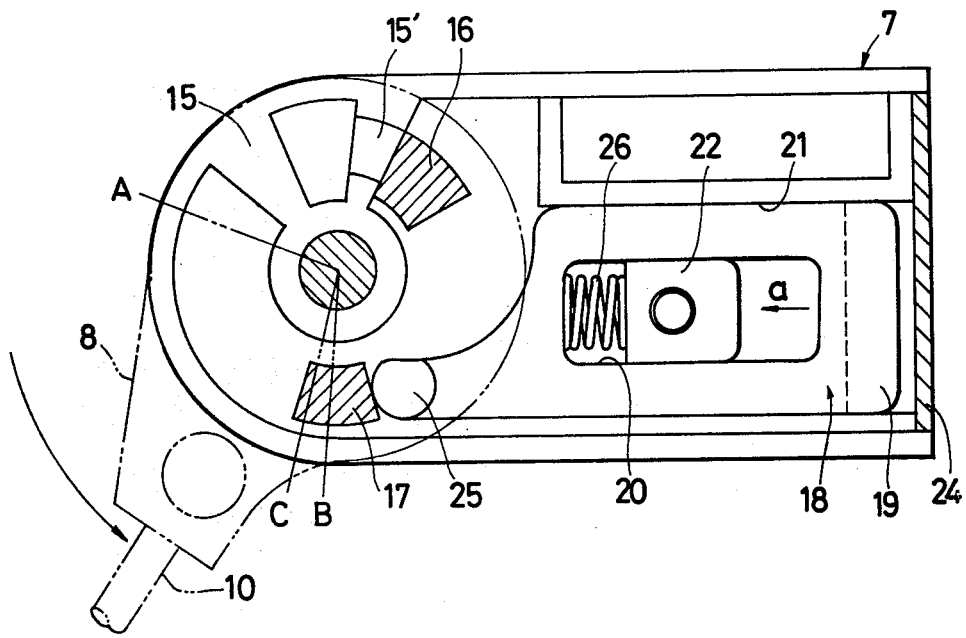
FIGS. 2A and 2B show positional relationships between a bail arm pivot cam and a kick lever in the mechanism of FIG. 1 with a cover plate removed, and, FIG. 3 shows a cross-sectional view showing the positional relationship between the bail arm pivot cam, the kick lever and the key plate according to the present invention.
Figure 2B:
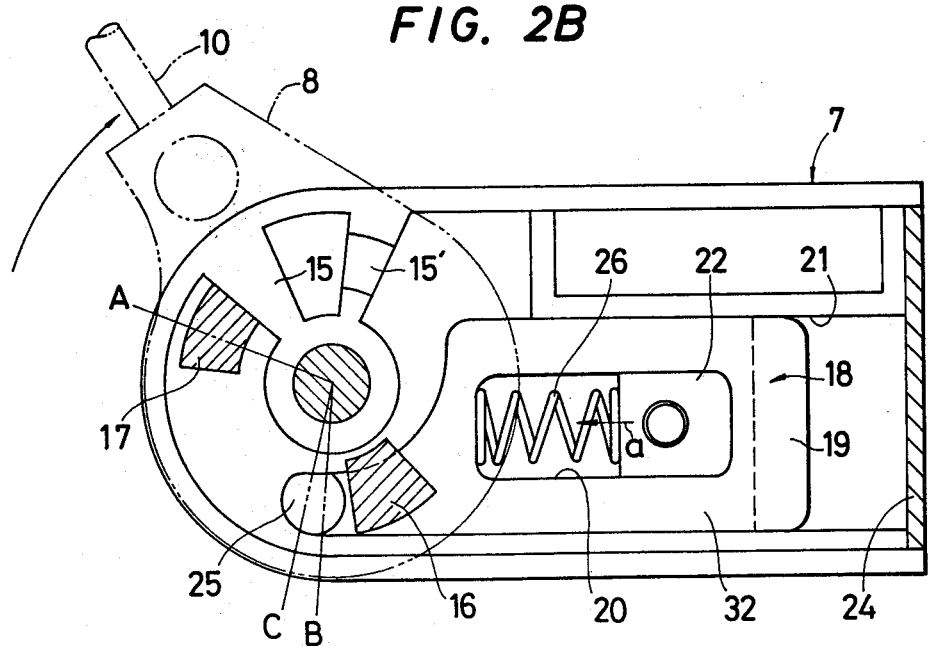

As shown in FIG. 2B, in the fishing line take-up state, the kick lever 18 is held at a position most frontward by the engagement between the detent 25 and the first boss 16, during the state of which the second boss 17 is at the position A. In this case, the detent 25 is positioned at B at which the detent is urged rearwardly when abutting the second boss 17 thereagainst during the fishing line release operation. That is, the detent 25 is in a predetermined position so as to abut the second boss 17 during the the bail releasing movement upon exceeding its dead point of the bail turn spring 14.

In the bail arm cocked position, the detent 25 is urged rearwardly by the second boss 17 to thereby move the kick lever 18 rearwardly (namely, to the direction opposite to the arrow a) against the biasing force of the spring 26 as shown in FIG. 2A. In this case, the end of the upright portion 19 is positioned along its rotational locus which includes the surface of a key plate 27 provided in the reel body 3. The end of the upright portion 19 is suitably inclined or curved so as to smoothly contact an inclined surface 28 of the key plate 27. Thus, the kick lever 18 is in its retracted position and is urged frontwardly by rotating the rotor 1 to cause abutment between the upright portion 19 and the inclined surface of the key plate to thereby pivot the pivot cam 8 toward bail arm rewind position.

With the structure thus organized, when the bail arm 10 is in the fishing line rewind position, the first boss 16 of the pivot cam 8 is held in contact with the detent projection 25 of the kick lever by the spring force of the spring 14, so that the kick lever 18 is urged to the left as viewed in FIG. 2B by the spring 14, whereby the bail arm is supported at the predetermined position together with the pivot cam 8. In this case, the second boss 17 is positioned at point A. Alternatively, as shown in FIGS. 2A and 2B, a supplemental projection 15 is provided on the support housing 7 to contact with the second boss 17 to thereby determine the maximum turning of the pivot cam.

If the bail arm is manually cocked, the bail arm 10 and the pivot cam 8 is reversely rotated upon the bail arm position being exceeded its dead point marked C thereby abutting the first boss 16 with the projection 15' as seen in FIG. 2A. In this case, the second boss 17 is moved to stop at the point B to urge the detent projection 25 rightwardly, so that the kick lever 18 is urged to the right against the force of the spring 26, resulting in that the end of the upright portion 19 of the kick lever reaches at the locus to be brought into contact with the key plate 27 of the reel body.

If the handle is turned to rotate the rotor with the bail arm cocked, in order to realize rewinding operation, the upright projection 19 abuts against the key plate 27 to urge the kick lever leftwardly, so that the detent 25 urges the second boss 17 leftwardly. When the second boss 17 exceeds the dead point C the bail arm and the pivot cam are rotated clockwise due to the spring force of the spring 14, whereby the bail arm is in a fishing line take-up position as seen in FIG. 2B. In this case, the first boss 16 abuts against the detent 25 in which the kick lever 18 is not further moved leftwardly by the engagement between the slot 20 and the column 22. Thus, there is no fear under this condition that the rotation of the rotor will bring about unwanted contact between the upright portion and the key plate, since the key plate is positioned spaced apart from the upright portion 19 as shown by the solid line in FIG. 3 during the take-up operation.

What is claimed is:

1. A bail arm latching and releasing mechanism for spinning reel, which includes a bail arm pivotally mounted at both ends on diametrically opposite sides of a rotor for swinging movement thereacross between cocked and rewind position, a kick lever, a pivot cam mounted on one end of the bail arm, a lever member mounted on the other end of the bail arm, the kick lever and the pivot cam being slidably and pivotally mounted respectively on a support housing of the rotor, a coil spring biasing the kick lever toward the pivot cam and into engagement therewith characterized by
    (a) the kick lever 18 having a L-shaped configuration including a radially extending upright portion 19,
    (b) a bail arm turn spring 14 secured at one end to the lever member 9 and at the other end to the support housing 7' to bias the bail arm 10 toward cocked and rewind positions, the spring having a dead point between bail arm cocked and rewind positions, the biasing force of the spring 14 being larger than the coil spring 26,
    (c) the pivot cam 8 having a first boss 16 to selectively hold the bail arm 10 in the cocked position and having a second boss 17 to urge the kick lever 18 against the biasing force of the coil spring 26, the second boss 17 being engaged with a projection 15 provided on the support housing 7 of the rotor 1 to hold the bail arm 10 in its rewind position, the first boss 16 being engaged with the kick lever 18 to prevent rearward movement thereof when the second boss 17 is engaged with the projection 15, and
    (d) a key plate 27 mounted to the reel body 3 and disposed in the rotational path of the upright portion 19 of the kick lever 18 when the bail arm 10 is in cocked position.

2. A bail arm mechanism as defined in claim 1, wherein the kick lever includes an axially extending portion 32 having an elongated slot 20 therein, and the support housing 7 includes a radially outwardly extending column 22 slidably received in the slot 20.

3. A bail arm mechanism as defined in claim 1, wherein the upright portion 19 of the kick lever 18 is adapted to engage with an inclined surface 28 of the key plate 27 to thereby urge the kick lever 18 toward the pivot cam 8 resulting in rotation of the second boss 17 to shift the bail arm 10 from its cocked to rewind position.

4. A bail arm mechanism as defined in claim 1, wherein the axially extending portion 32 of the kick lever 18 carries a detent projection 25 on one end thereof adapted to engage the first boss 16 in the bail arm take-up position, said detent 25 being in the position between the first and the second bosses 16 and 17 at the rotational path thereof.

* * * * *